No. 778,391. Patented December 27, 1904.

UNITED STATES PATENT OFFICE.

JAMES HENRY WHITE, OF HENDERSONS CROSSROADS, TENNESSEE.

INSECTICIDE.

SPECIFICATION forming part of Letters Patent No. 778,391, dated December 27, 1904.

Application filed July 10, 1903. Serial No. 164,987.

*To all whom it may concern:*

Be it known that I, JAMES HENRY WHITE, a resident of Hendersons Crossroads, in the county of Wilson and State of Tennessee, have invented certain new and useful Improvements in Insecticides; and I do hereby declare the following to be a full, clear, and exact description of the invention, such as will enable others skilled in the art to which it appertains to make and use the same.

My invention relates to an improved insecticide, the object of the invention being to provide an improved composition for the destruction of insects and bugs of all kinds on all kinds of trees, plants, &c.; and it consists in certain novel combinations of ingredients mixed in the manner stated and for the purpose set forth.

My improved composition or compound consists in the following ingredients in substantially the proportions stated: pure rain-water, one and one-half gallons; pure corrosive sublimate, two ounces; carbolic acid, one pound; aqua-ammonia, one pound; arsenite of copper, three and one-half ounces; Fowler's solution of arsenic, one and one-half pounds. These ingredients are mixed in the order stated—that is to say, that corrosive sublimate is first mixed with the water, the carbolic acid then added, and so on until the entire composition is mixed.

The composition is to be used at the roots of trees, plants, &c., so that it may circulate with the sap and give tone and new life to the tree or plant and kill all insects thereon. It can also be used in spraying trees when reduced to about one-half its strength, and a good composition for spraying is accomplished by the above-set-forth ingredients with about twenty per cent. crude petroleum-oil added.

By the admixture of the ingredients and their chemical decomposition a product is the result which will not only destroy insects in trees and plants, but will also improve the growth and health of the tree, as well as improve the fruit on fruit-trees.

Various slight changes might be made in the relative proportions of the ingredients stated, and hence I do not wish to be restricted thereto.

Having fully described my invention, what I claim as new, and desire to secure by Letters Patent, is—

1. A composition of matter, consisting of water, corrosive sublimate, carbolic acid, aqua-ammonia, arsenite of copper, and Fowler's solution of arsenic, in substantially the proportions stated.

2. A composition of matter, consisting of water, corrosive sublimate, carbolic acid, aqua-ammonia, arsenite of copper, Fowler's solution of arsenic, and crude petroleum-oil, in substantially the proportions stated.

In testimony whereof I have signed this specification in the presence of two subscribing witnesses.

JAMES HENRY WHITE.

Witnesses:
PEYTON W. CARNEY,
N. A. TALLEY.